March 27, 1928.
A. L. V. C. DEBRIE
1,663,625
FILM DRIVING MECHANISM FOR CINEMATOGRAPHIC VIEW TAKING APPARATUS
Filed June 13, 1927  2 Sheets-Sheet 1
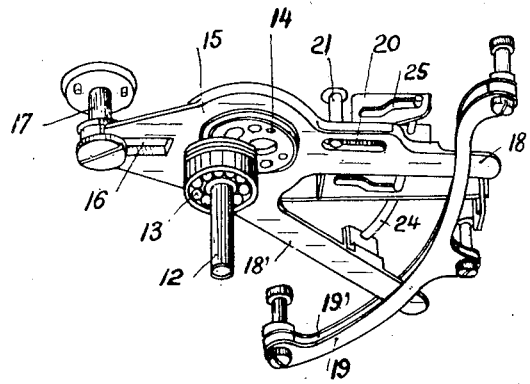
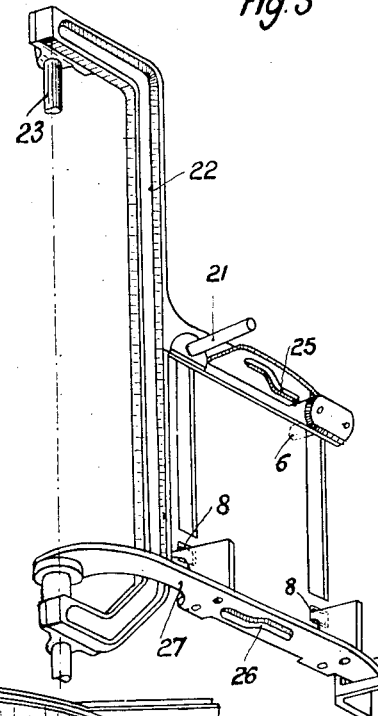
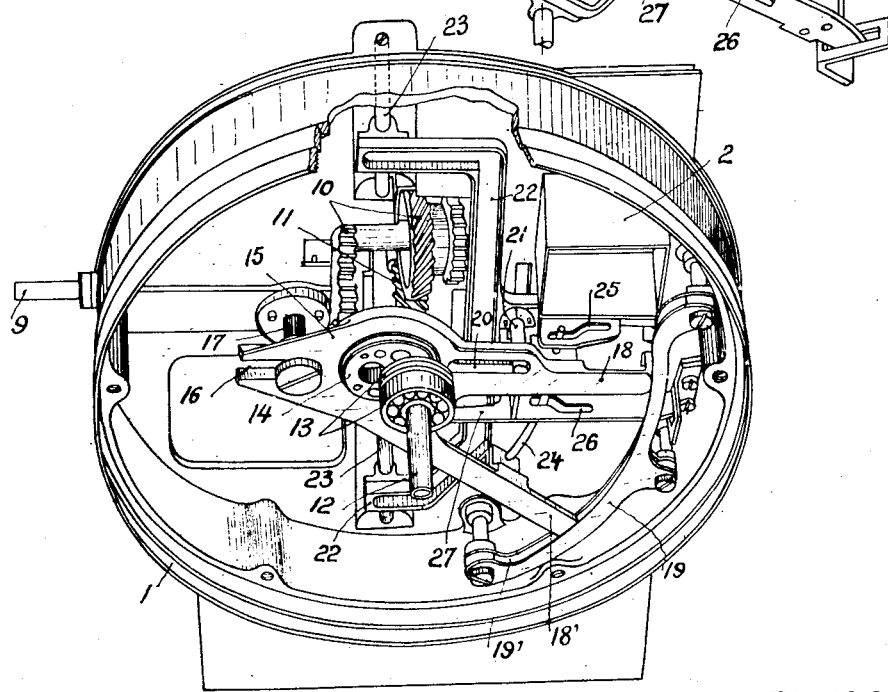
INVENTOR
Andre L. V. C. Debrie March 27, 1928.   
A. L. V. C. DEBRIE   
1,663,625

FILM DRIVING MECHANISM FOR CINEMATOGRAPHIC VIEW TAKING APPARATUS

Filed June 13, 1927   2 Sheets-Sheet 2

INVENTOR
Andre L. V. C. Debrie
by
Langner, Parry, Card and Langner
Att'ys.

Patented Mar. 27, 1928.

1,663,625

UNITED STATES PATENT OFFICE.

ANDRÉ LÉON VICTOR CLÉMENT DEBRIE, OF PARIS, FRANCE.

FILM-DRIVING MECHANISM FOR CINEMATOGRAPHIC VIEW-TAKING APPARATUS.

Application filed June 13, 1927, Serial No. 198,670, and in France July 22, 1926.

My invention has for its object a film driving mechanism for cinematographic view taking apparatuses the size of which is much smaller than that of the similar mechanisms now in use, whilst its accuracy of working is not diminished in the least and its arrangement allows a very simple control of the shutter.

This mechanism comprises chiefly a carriage bearing the driving clutches and slidably secured to a guiding rod round which it can pivot to some extent whereby the clutches which pass each through a slot in the rear plate of the apparatus, are allowed to move reciprocatingly from top to bottom and reversely and also to move to and fro with reference to the film. The movements of the carriage are controlled by an eccentric or by a cam driven by the crank of the apparatus and giving the carriage through a stud sliding in a slot its reciprocating vertical motion. The shutter is keyed to the eccentric shaft.

The eccentric which is guided so as to move exactly in a plane parallel to the front plate of the apparatus, is provided with an incurved projection adapted to move in a suitably shaped winding groove formed in a part integral with the carriage to which it imparts a slight rotation round its sliding axis when necessary, whereby the clutches are made to move forwards or rearwards.

The incurved projection is guided in a second winding groove having the same shape as the first one, but reversely disposed with reference thereto and formed in a part integral with a lever which cannot slide but can pivot round the sliding rod to which the carriage is secured. This lever bears the film locking studs which project beyond the rear plate of the apparatus. By means of this arrangement when the driving clutches have finished their driving movement and recede away from the film, the locking studs come into engagement with the film which is thus held securely. On the contrary when the driving clutches have finished their upwards movement during which they are disengaged from the film, they come again into engagement with the film and drive it again downwards whilst the locking studs recede and release the film.

I have shown by way of example on appended drawings a form of execution of my invention.

Fig. 1 is a perspective view of the whole mechanism.

Figs. 2 and 3 are perspective views of the carriage bearing the driving clutches and of the lever bearing the locking studs.

Figure 4:
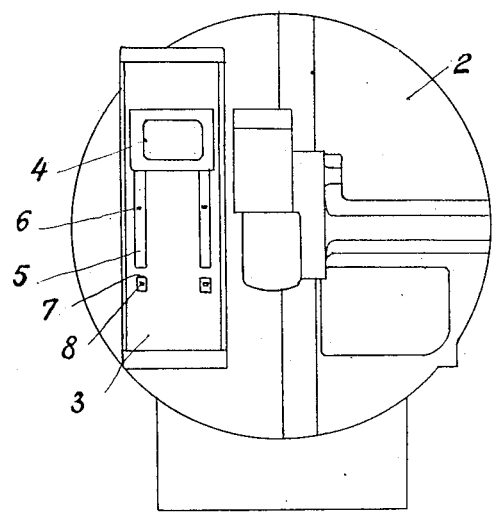
Fig. 4 is a view of the rear part of the apparatus as seen from the front.

The whole mechanism is enclosed in a box 1 which may be cylindrical as in the case illustrated and the walls of which may be very thin. This box is closed at the rear of the apparatus by a plate 2 (Fig. 4) provided with a channel 3 for the film and showing a view taking aperture 4, with two vertical slots 5 wherein the driving clutches 6 are adapted to move, and, below these, with two small apertures 7 through which may project the locking studs 8.

The crank, not shown, keyed to the shaft 9 (Fig. 1) drives through the gearwork 10 and the worm 11, with a suitable speed reduction, the rod 12 to which is keyed the shutter not shown and which bears the ball and thrust bearings 13. To this rod or shaft is keyed an eccentric 14 which drives a forked part 15 (Figs. 1 and 2) one end of which shows a slot 16 moving in front of a stationary guiding spigot 17. The forked part 15 is provided moreover with two arms 18, 18' moving between two incurved guides 19, 19' secured to the bottom of the box 1 whereby the part 15 is made to move in a plane exactly parallel to the rear plate 2.

The arm 18 shows a longitudinal slot 20 which is engaged by a projection 21 of the carriage 22 (Figs. 1 and 3) which bears the driving clutches 6 of the film. This carriage may slide along the guiding rod 23 integral with the box 1 and rotate slightly with reference to the said rod.

The two arms 18 and 18' of the forked eccentric part 15 bear an incurved projection 24 engaging a winding substantially S-shaped groove or slot 25 provided in a plate integral with the carriage 22. This projection 24 also engages another similarly shaped groove or slot 26, parallel to slot 25 but reversely disposed with reference thereto and provided in a plate borne by a lever 27 which pivots round the spindle 23 without sliding along it; this lever bears the locking studs 8.

Figure 7:
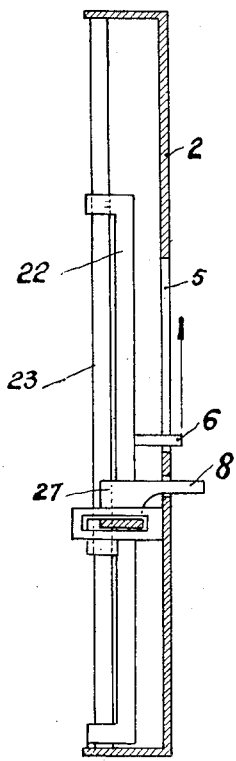
Figs. 5, 6 and 7 are sectional views of the driving clutches and locking studs in three successive positions.
Figure 6:
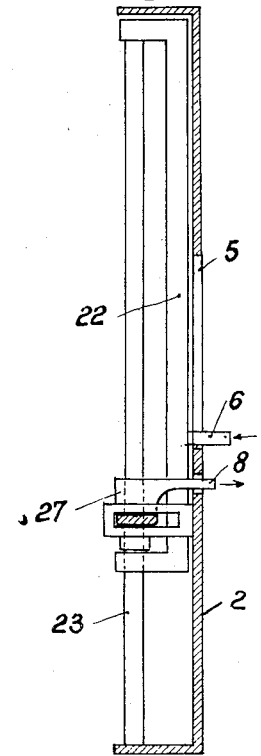
Figure 5:
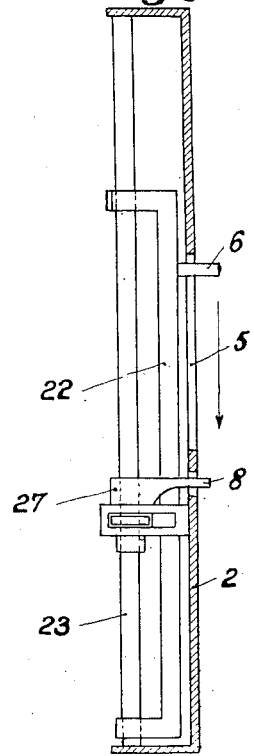

The working is as follows: Under the action of the crank, the shaft 12 rotates and through the eccentric 14 gives part 15 a reciprocating motion. Part 5 draws along with it the carriage 22 and the driving clutches 6 reciprocate along rod 23. When the clutches 6 are at the top of their drive as shown on Figs. 1 and 3, the incurved projection 24 is in that part of the groove 25 which is the farthest away from the plate 2; the clutches 6 project to a great extent through the slots 5 and engage each a perforation of the film which they will drive during their downward movement. During this time, the projection 24 is in the part of the groove 26 which is the nearest to plate 2. As part 15 is guided so as to remain in a plane parallel to the plate, it makes the lever 27 pivot round the shaft 23: The locking studs are removed from the film perforations and the film is left free to move downwards. When the driving clutches arrive at the end of their path (Fig. 6) the projection 24 enters that part of the groove 25 which is the nearest to plate 2: The carriage 22 pivotes round the axis 23 and the clutches 6 recede and release the film; at the same moment the said projection 24 passes through the part of the groove 26 which is the farthest removed from plate 2; the lever 27 pivots in the reverse direction and the locking studs project again and engage the perforations of the film which is thus held securely whilst the driving clutches 6 which have receded (Fig. 7) move upwards. Finally when these clutches are at the top of their path, the carriage 22 and the lever 27 pivot again in reverse directions one with reference to the other. The clutches 6 reengage the film which is disengaged by the locking studs and so on.

Of course the above described form of execution is given only by way of example and its details may be varied without widening the scope of the invention. Thus for instance the eccentric 14 may be replaced by a cam although this would provide a somewhat rougher movement.

My improved mechanism which is very small may be used with advantage in view taking apparatuses in two parts such as the one described in my French Patent 596,907 dated April 20, 1925, and comprising a front part containing the objective lens (or lenses) and the film driving mechanism and a rear part adapted to be secured easily and speedily on the front part and containing the reel holders. In this case the box containing the mechanism and constituting the front of the apparatus may be easily carried if necessary in the operator's pocket.

What I claim is:

1. A film driving mechanism in cinematographic view taking machines comprising a casing, a guiding rod parallel to the wall of the casing opposite to the film, a carriage slidably borne by said rod and adapted to pivot round same whilst remaining near parallelism with the abovementioned casing wall, a slotted part perpendicular to the guiding rod and borne by the carriage, said slot comprising two communicating parts substantially parallel to and unequally distant from the abovementioned casing wall, film driving clutches aligned perpendicularly to the guiding rod and borne by said carriage, an eccentric driven by the general control of the machine and adapted to drive the carriage to and fro along the guiding rod, means whereby the eccentric is prevented from moving out of a plane parallel to the abovementioned casing wall and an incurved projection parallel to the said wall and borne by said eccentric and adapted to move in the abovementioned slot.

2. A film driving mechanism in cinematographic view taking machines comprising a casing, a guiding rod parallel to the wall of the casing opposite to the film, a carriage slidably borne by said rod and adapted to pivot round same whilst remaining near parallelism with the abovementioned casing wall, a slotted part perpendicular to the guiding rod and borne by the carriage, said slot comprising two communicating parts substantially parallel to and unequally distant from the abovementioned casing wall, film driving clutches aligned perpendicularly to the guiding rod and borne by said carriage, an eccentric driven by the general control of the machine and adapted to drive the carriage to and fro along the guiding rod, means whereby the eccentric is prevented from moving out of a plane parallel to the abovementioned casing wall, an incurved projection parallel to the said wall and borne by said eccentric and adapted to move in the abovementioned slot, film locking studs, a slotted lever pivotally secured to the guiding rod and bearing the said studs aligned perpendicularly to the guiding rod, the slot in the lever being parallel and similar in shape to first abovementioned slot but reversed with reference thereto and passing over the incurved projection on the eccentric.

3. In a film driving mechanism as claimed in claim 1, a fly wheel constituted by the shutter of the machine and a shaft to which are keyed both fly wheel and eccentric.

In testimony whereof I have signed my name to this specification.

ANDRÉ LÉON VICTOR CLÉMENT DEBRIE.